United States Patent
Byron

(10) Patent No.: US 12,399,764 B2
(45) Date of Patent: Aug. 26, 2025

(54) FACILITATING ERROR CORRECTIONS DURING TESTING OF PROPOSED CODE

(71) Applicant: Capital One Services, LLC, McLean, VA (US)

(72) Inventor: Robert Byron, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 149 days.

(21) Appl. No.: 18/338,316

(22) Filed: Jun. 20, 2023

(65) Prior Publication Data
US 2024/0427656 A1 Dec. 26, 2024

(51) Int. Cl.
*G06F 11/36* (2025.01)
*G06F 11/07* (2006.01)
*G06F 11/32* (2006.01)
*G06F 11/3668* (2025.01)

(52) U.S. Cl.
CPC ...... *G06F 11/0772* (2013.01); *G06F 11/0793* (2013.01); *G06F 11/327* (2013.01); *G06F 11/3692* (2013.01)

(58) Field of Classification Search
CPC .......... G06F 11/0772; G06F 11/0793; G06F 11/3692; G06F 11/327
See application file for complete search history.

(56) References Cited

U.S. PATENT DOCUMENTS

| 6,223,144 | B1* | 4/2001 | Barnett | G06F 11/3664 703/22 |
| 8,166,348 | B1* | 4/2012 | Kulkarni | G06F 11/366 717/124 |
| 2019/0108001 | A1* | 4/2019 | Hauser | G06F 11/3672 |
| 2019/0121717 | A1* | 4/2019 | Francis | G06F 11/0793 |
| 2021/0208855 | A1* | 7/2021 | Zhang | G06F 8/36 |
| 2021/0342209 | A1* | 11/2021 | Kishore | G06F 11/0769 |
| 2022/0101115 | A1* | 3/2022 | Zhou | G06F 40/103 |

OTHER PUBLICATIONS

Wikipedia's Machine Learning historical version published Jun. 19, 2023 https://en.wikipedia.org/w/index.php?title=Machine_learning&oldid=1160951694 (Year: 2023).*
Log Sculptor: Making Logs Great Again by Aditya Kulkarni Published in: 2024 IEEE International Conference on Big Data https://ieeexplore.ieee.org/stamp/stamp.jsp?tp=&arnumber=10825361 (Year: 2024).*

* cited by examiner

*Primary Examiner* — Joseph O Schell
(74) *Attorney, Agent, or Firm* — Foley & Lardner LLP

(57) ABSTRACT

Methods and systems are described herein for facilitating error corrections during testing of proposed code. The system may receive, via a user interface, a proposed code for testing on an application testing platform and may request initiation, on the application testing platform, of an application testing protocol of the proposed code. The system may receive, from the application testing platform, testing logs associated with the proposed code. The plurality of testing logs may include error notifications, and the system may determine explanations and proposed corrections corresponding to the error notifications. The system may output, via the user interface, an aggregation of the testing logs with the explanations and proposed corrections.

19 Claims, 7 Drawing Sheets

FACILITATING ERROR CORRECTIONS DURING TESTING OF PROPOSED CODE

BACKGROUND

Conventional code testing platforms are often archaic and difficult to use. Code testing platforms can provide a user with testing logs containing results from code testing runs. The testing logs are intended to provide a user with errors such that the user can fix the errors and re-run the tests. However, coding errors can be difficult to find among hundreds of lines of code and across multiple testing logs. Once errors are identified, notifications describing the errors often consist of technical language that is not readily understandable. Furthermore, fixing these errors can be labor-intensive and time-consuming, even after the technical language is decoded. These technical drawbacks can cause errors to be overlooked or misinterpreted, leading to further failure of the code testing. Thus, a mechanism is desired for facilitating error corrections during testing of proposed code.

SUMMARY

Methods and systems are described herein for facilitating error corrections during testing of proposed code. For example, the methods and systems are described herein for providing explanations of error notifications with proposed corrections for a user to fix coding errors.

Existing systems often provide users with code testing results in formats that are difficult to understand and remediate (e.g., in the event of failure). For example, existing systems often fail to decode cryptic language or provide possible corrections to errors. Even when lower-level code libraries are able to provide possible corrections within error messages, these corrections may not be reliable. The difficulty in adapting systems for these practical benefits involves several technical challenges such as a need for massive data repositories in order to provide users with accurate explanations of, and corrections to, every possible coding error. To overcome these technical deficiencies in adapting systems for these practical benefits, methods and systems disclosed herein derive possible corrections from testing logs themselves instead of from lower-level code libraries with unreliable error messages. The system may determine explanations corresponding to error notifications by referencing a predetermined list of common explanations that correspond to different categories of errors. For example, the system may determine, based on error notifications, one or more error types in the proposed code. The system may then determine explanations and proposed corrections based on the one or more error types, thus bypassing the need for massive data repositories in order to provide users with accurate explanations of and corrections to every possible coding error. Accordingly, the methods and systems provide easy-to-understand instructions for a user to fix coding errors.

In particular, the error correction system may receive, from a user, inputs associated with testing a proposed code. The inputs may include a user registration (e.g., including authentication information associated with a user), an application registration (e.g., including testing requests), and a configuration selection (e.g., including a language configuration). For example, inputs may include authentication information for the user to gain access to an application testing program, as well as testing requests and language configurations for the application testing program to use for testing the proposed code.

The error correction system may then generate a text file by aggregating the plurality of inputs from the user with an application testing code. In some embodiments, the error correction system may generate a text file that is readable by the application testing platform. For example, the error correction system may generate the text file in a format, language, file type, size, or other form that is readable by the application testing platform.

The error correction system may receive, via the user interface, a proposed code for testing on the application testing platform. The proposed code may be a code that a user wishes to test for errors, functionality, performance, or other types of testing. The error correction system may then request initiation, on the application testing platform, of an application testing protocol of the proposed code according to the text file. For example, the error correction system may request that the application testing platform initiate testing of the proposed code according to the inputs received from the user (e.g., authentication, testing requests, and language configuration).

The error correction system may receive, from the application testing platform, testing logs associated with the proposed code. For example, the application testing platform may run the application testing protocol simultaneously on multiple platforms, generating multiple testing logs. The testing logs may include results from the application testing protocol, which may include one or more error notifications. The error correction system may determine, based on the one or more error notifications, one or more error types in the proposed code. For example, the error correction system may determine to which categories of errors the one or more error notifications belong. Furthermore, for each detected error message, the error correction system may output probability weights indicating match likelihood for each category of errors.

The error correction system may determine explanations corresponding to the one or more error types and proposed corrections for each error associated with each error type of the one or more error types. For example, the explanations may describe technical language of error notifications in language that is more intuitive or easier to understand. The proposed corrections may include common fixes to error types associated with the error notifications. In some embodiments, the error explanations and proposed corrections may be generated by semi-supervised Generative Pre-trained Transformer (GPT) models. Such models may allow users to ask follow-up questions through an automated chat interface. GPT-based models may be able to generate easily-intelligible responses to user queries. In some embodiments, a user may fine-tune the model by adding custom error matching patterns or corresponding explanations, in the event that the model-generated explanations lack clarity.

The error correction system may output, via the user interface, an aggregation of the plurality of testing logs with the one or more explanations and the one or more proposed corrections. For example, the error correction system may output the testing results with error notifications highlighted, aggregated, or otherwise organized so that errors are easier to find. In some embodiments, the system may allow users to filter out redundant or extraneous information using pattern matching tools (e.g., user-defined regular expressions). Furthermore, the error correction system may use semi-supervised GPT-based models to parse test logs and identify specific errors within the test logs. Such GPT-based models may also be used to create explanations that are more easily understood than default low-level error messages, along with the proposed corrections to the errors. In some embodiments, GPT-based models may be trained using an organization's databases to provide explanations aligned with an organization's internal language, terms, and aliases.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
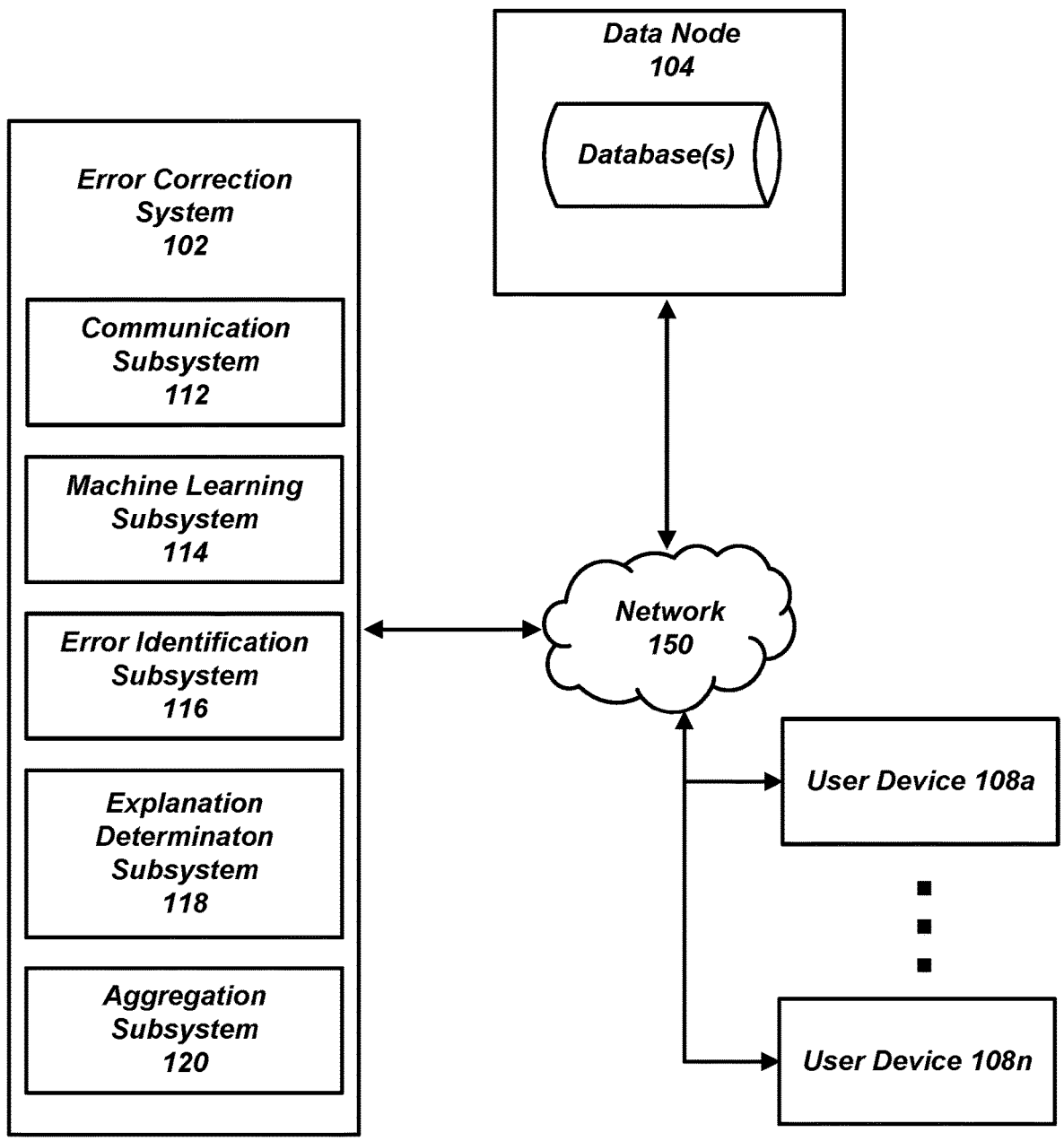
FIG. 1 shows an illustrative system for facilitating error corrections during testing of proposed code, in accordance with one or more embodiments.

FIG. 1 shows an illustrative system 100 for facilitating error corrections during testing of proposed code, in accordance with one or more embodiments. System 100 includes error correction system 102, data node 104, and computing devices 108a-108n. Error correction system 102 may include communication subsystem 112, machine learning subsystem 114, error identification subsystem 116, explanation determination subsystem 118, aggregation subsystem 120, or other subsystems. In some embodiments, computing devices 108a-108n may be remote computing devices that may receive and send data via network 150. Each computing device 108 may include any type of mobile terminal, fixed terminal, or other device. By way of example, computing device 108 may include a desktop computer, a notebook computer, a tablet computer, a smartphone, a wearable device, or other client device. It should be noted that, while one or more operations are described herein as being performed by particular components of error correction system 102, those operations may, in some embodiments, be performed by other components of error correction system 102 or other components of system 100. As an example, while one or more operations are described herein as being performed by components of error correction system 102, those operations may, in some embodiments, be performed by components of computing devices 108a-108n.

Error correction system 102 may execute instructions for correcting errors during testing of proposed code. Error correction system 102 may include software, hardware, or a combination of the two. For example, error correction system 102 may be a physical server or a virtual server that is running on a physical computer system. In some embodiments, error correction system 102 may be configured on a user device (e.g., a laptop computer, a smart phone, a desktop computer, an electronic tablet, or another suitable user device).

Data node 104 may store various data, including user information, application information, configuration information, and/or other suitable data. Data node 104 may include software, hardware, or a combination of the two. For example, data node 104 may be a physical server, or a virtual server that is running on a physical computer system. In some embodiments, error correction system 102 and data node 104 may reside on the same hardware and/or the same virtual server/computing device. Network 150 may be a local area network, a wide area network (e.g., the Internet), or a combination of the two.

Error correction system 102 (e.g., communication subsystem 112) may provide, via a user interface, functionality for a user to select a plurality of inputs. For example, the functionality may include an interface with which the user can interact. In some embodiments, the user may select the inputs from a dropdown menu, from a series of icons or other selectable portions of the interface, by entering the inputs into text fields, or by other means.

In some embodiments, error correction system 102 (e.g., communication subsystem 112) may receive, via a user interface, a plurality of inputs from a user. The plurality of inputs may include a user registration, an application registration, and a configuration selection. In some embodiments, user registration may include identification information associated with the user, authentication information associated with the user, or any other relevant information associated with the user. In some embodiments, application registration may include information regarding one or more components of the application, testing protocol, testing requests, or other application information, including required "secrets" for dependent services which require authentication and authorization. In some embodiments, secrets may be used by the application (e.g., like a password) to call other dependent services. In some embodiments, configuration selection may include mock test data as inputs for test cases to process, as well as function calls or application programming interface (API) calls for a particular programming language or other configuration settings.

Figure 2:
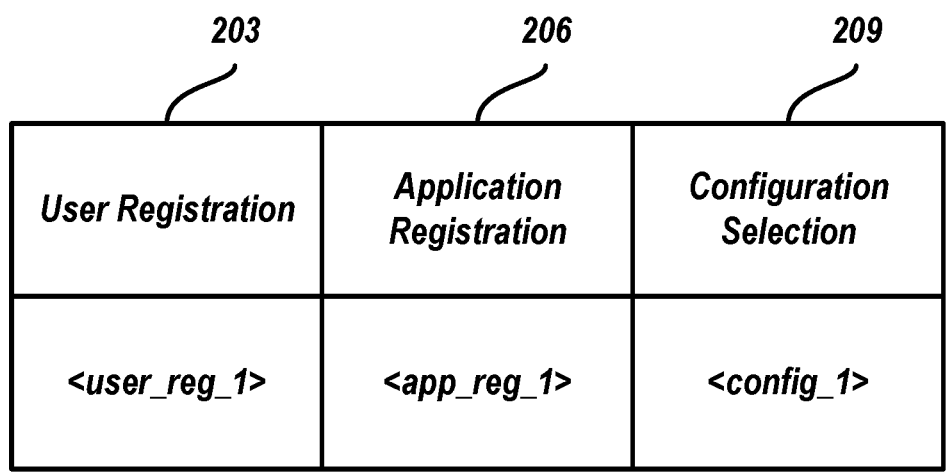
FIG. 2 shows a data structure storing user inputs for configuring an application testing protocol, in accordance with one or more embodiments.

FIG. 2 shows a data structure 200 storing user inputs for configuring an application testing protocol, in accordance with one or more embodiments. For example, data structure 200 may include user registration 203, application registration 206, configuration selection 209, or other data fields. In some embodiments, data structure 200 may be a subset of a larger data structure.

Returning to FIG. 1, error correction system 102 (e.g., communication subsystem 112) may generate a text file by aggregating the plurality of inputs from the user with an application testing code such that the text file is readable by an application testing platform. In some embodiments, communication subsystem 112 may generate the text file to include the data fields from data structure 200. In some embodiments, the file type output may be JSON, CSV, HAR (e.g., for tests that use HTTP requests), or another type. In some embodiments, communication subsystem 112 may input the data fields from data structure 200 into certain locations of a pre-generated code, such as an application testing code. An application testing code may be a code required to run the application testing protocol. In some embodiments, the application testing code may be deployed on a separate platform using one or more API calls. In some embodiments, communication subsystem 112 may generate the text file in a format, language, or other manner such that the text file is readable by the application testing platform.

Communication subsystem 112 may receive, via the user interface, a proposed code for testing on the application testing platform. In some embodiments, the proposed code may be a code to be tested on the application testing platform. The proposed code may be generated by the user and subsequently input to error correction system 102 via communication subsystem 112.

Figure 3:
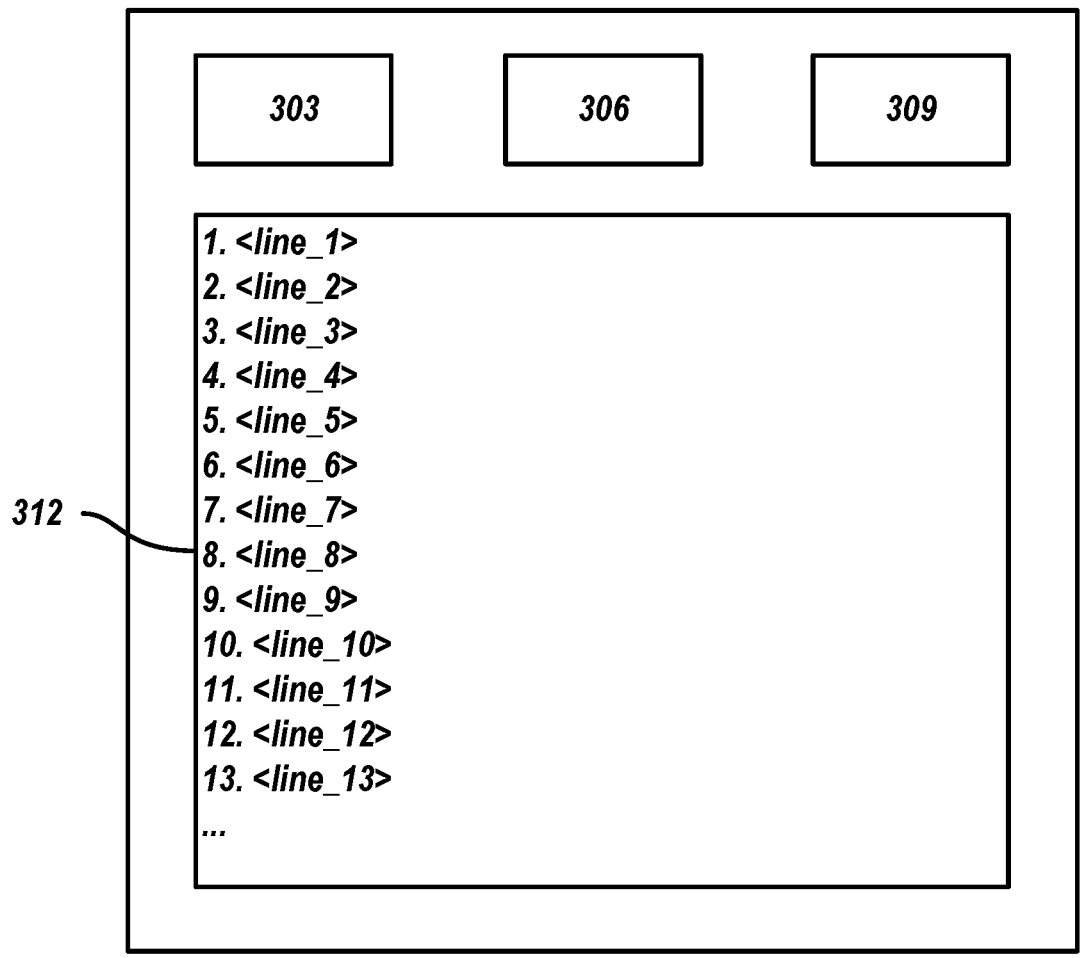
FIG. 3 illustrates a user interface for testing proposed code, in accordance with one or more embodiments.

FIG. 3 illustrates a user interface 300 for testing proposed code, in accordance with one or more embodiments. In some embodiments, user interface 300 may include one or more portions with which a user may interact (e.g., make selections, input text, or otherwise interact). For example, portion 303 may include functionality for the user to input user registration information. Portion 306 may include functionality for the user to input application registration information. Portion 309 may include functionality for the user to input configuration information. In some embodiments, portion 312 may be a text field in which the user may input proposed code, modify proposed code, receive testing results, or perform other functions. For example, as illustrated, portion 312 may show a subset of proposed code.

In some embodiments, communication subsystem 112 may request initiation, on an application testing platform, of an application testing protocol. For example, the application testing protocol may include testing of the proposed code, and the testing protocol may occur on the application testing platform. The application testing protocol may involve testing of software applications using scripts, tools, test automation frameworks, or other techniques to identify errors. In some embodiments, the application testing platform may perform the application testing protocol according to the text file. For example, communication subsystem 112 may transmit the proposed code and the text file to the application testing platform. In some embodiments, communication subsystem 112 may transmit the text file to a dataset or repository that the application testing platform may access. The application testing platform may then perform the testing protocol according to the user registration, application registration, configuration selection, and any other information included in the text file. The request for initiation of the application testing protocol may include one or more function calls or API calls to the application testing platform requesting initiation of the testing protocol.

In some embodiments, prior to requesting initiation of testing protocol, communication subsystem 112 may determine an environment in which the proposed code will run after completion of the application testing protocol. For example, an environment may be a hardware platform or operating system that the proposed code will run on. In some embodiments, an environment may include a compiler and associated development tools. Communication subsystem 112 may request information about the environment from the user via a user interface (e.g., user interface 300). In some embodiments, communication subsystem 112 may provide functionality for the user to input the information about the environment via the user interface. Upon requesting initiation of the application testing protocol, communication subsystem 112 may transmit details associated with the environment to the application testing platform. In some embodiments, this may enable the application testing platform to mimic the environment during the application testing protocol.

In some embodiments, requesting initiation, on the application testing platform, of the application testing protocol may include requesting initiation of one or more types of testing protocol. For example, communication subsystem 112 may request initiation of at least a unit testing protocol, an integration testing protocol, a functional testing protocol, and a performance testing protocol. Unit testing may include testing the smallest testable parts of an application (e.g., units) individually and independently for proper operation. Integration testing may include testing whether multiple components of an application system work with each other. Functional testing may include testing whether each application feature works as per software requirements. For example, each function may be compared to a corresponding requirement to ascertain whether its output is consistent with expectations. Performance testing may include testing how stability, speed, scalability, and responsiveness of an application hold up under a given workload. In some embodiments, the communication subsystem 112 may request initiation of other types of testing protocols. In some embodiments, requesting initiation of the testing protocol may include a function call or API call to the application testing platform for each type of testing protocol.

In some embodiments, communication subsystem 112 may receive a request, via the user interface, to abort the application testing protocol. Communication subsystem 112 may request a discontinuation, on the application testing platform, of the application testing protocol of the proposed code. The request to abort the application testing protocol may include one or more function calls or API calls to the application testing platform requesting that the application testing platform abort the testing protocol.

In some embodiments, communication subsystem 112 may receive, from the application testing platform, testing logs associated with the proposed code. Testing logs may be a type of test artifact that is generated during application testing protocol. Testing logs may provide comprehensive information about each test run's success to validate quality, performance, and functionality of proposed code. For example, the testing logs may include results from the application testing protocol. In some embodiments, the testing logs include one or more error notifications. For example, the error notifications may indicate issues within the software. Some of these error messages may be meant for the user to resolve issues while others may be used by the user to locate problems within the code. In some embodiments, error correction system 102 (e.g., error identification subsystem 116) may determine, based on the one or more error notifications, one or more error types in the proposed code. The error types may include categories of errors, such as runtime errors, logic errors, compilation errors, syntax errors, interface errors, resource errors, arithmetic errors, or other types of errors. In some embodiments, the one or more error types may be subcategories of the aforementioned categories. For example, types of syntax errors may include a missing or misplaced comma or quotation mark, a misspelled word, or other syntax errors. Types of logic errors may include incorrect use of logical operators or Boolean operators, creation of an infinite loop, incorrect use of brackets, and so on. Error identification subsystem 116 may assess the error notifications and determine characteristics of each error notification. Error identification subsystem 116 may then determine, based on these characteristics, how to characterize each error notification (e.g., according to the error types discussed above).

In some embodiments, error correction system 102 (e.g., explanation determination subsystem 118) may determine one or more explanations corresponding to the one or more error types for each error associated with each error type of the one or more error types. In some embodiments, explanations may be intuitive messages that explain the error notifications. For example, the error notifications may include technical language that is difficult to interpret. The explanations may provide more easily interpreted messages. As an example, an explanation for an error message of "error(msg: string, . . . args: Array<unknown>)" may be "cannot invoke an expression whose type lacks a call signature" or "the type has no compatible call signature." In some embodiments, explanation determination subsystem 118 may determine the explanations based on the error type of each error notification. For example, explanation determination subsystem 118 may determine the one or more explanations by retrieving, from a database, a listing of common error types and corresponding intuitive descriptions. Explanation determination subsystem 118 may then identify the one or more error types associated with the error notifications within the listing. Explanation determination subsystem 118 may then determine the explanations based on corresponding intuitive descriptions associated with the one or more error types.

In some embodiments, explanation determination subsystem 118 may determine one or more proposed corrections for each error associated with each error type of the one or more error types. In some embodiments, proposed corrections may include suggested fixes for the errors identified by the error notifications. For example, explanation determination subsystem 118 may correct existing code, recommend new code, track changes within the code, or otherwise indicate proposed corrections. Explanation determination subsystem 118 may determine proposed corrections for the error notifications based on the error type of each error notification. For example, for a syntax error, a proposed correction may include an added comma or spelling correction. For a logic error, a proposed correction may include alternative testing parameters (e.g., Boolean or Integer values) to use at run time. Explanation determination subsystem 118 may display the changes in tracked changes, as new lines of code, as comments, or in another manner.

In some embodiments, determining the proposed corrections may involve retrieving, from a database, a listing of common error types and corresponding code changes. Explanation determination subsystem 118 may then identify the one or more error types within the listing. Explanation determination subsystem 118 may then determine the one or more proposed corrections based on one or more corresponding code changes associated with the one or more error types. In some embodiments, communication subsystem 112 may transmit, to a database (e.g., data node 104), a code change request including an error type of the one or more error types and a corresponding code change of the one or more corresponding code changes. In some embodiments, communication subsystem 112 may transmit the code change request to a source code hosting platform (e.g., Git repository).

In some embodiments, error correction system 102 (e.g., aggregation subsystem 120) may output, via a user interface, an aggregation of testing logs with one or more explanations and one or more proposed corrections. For example, aggregating the testing logs with the explanations and the proposed corrections may involve eliminating redundancies across the plurality of testing logs and translating error notifications into explanations and proposed corrections. In some embodiments, aggregation subsystem 120 may modify one or more portions of the aggregation of the plurality of testing logs to emphasize the one or more error notifications.

Figure 4:
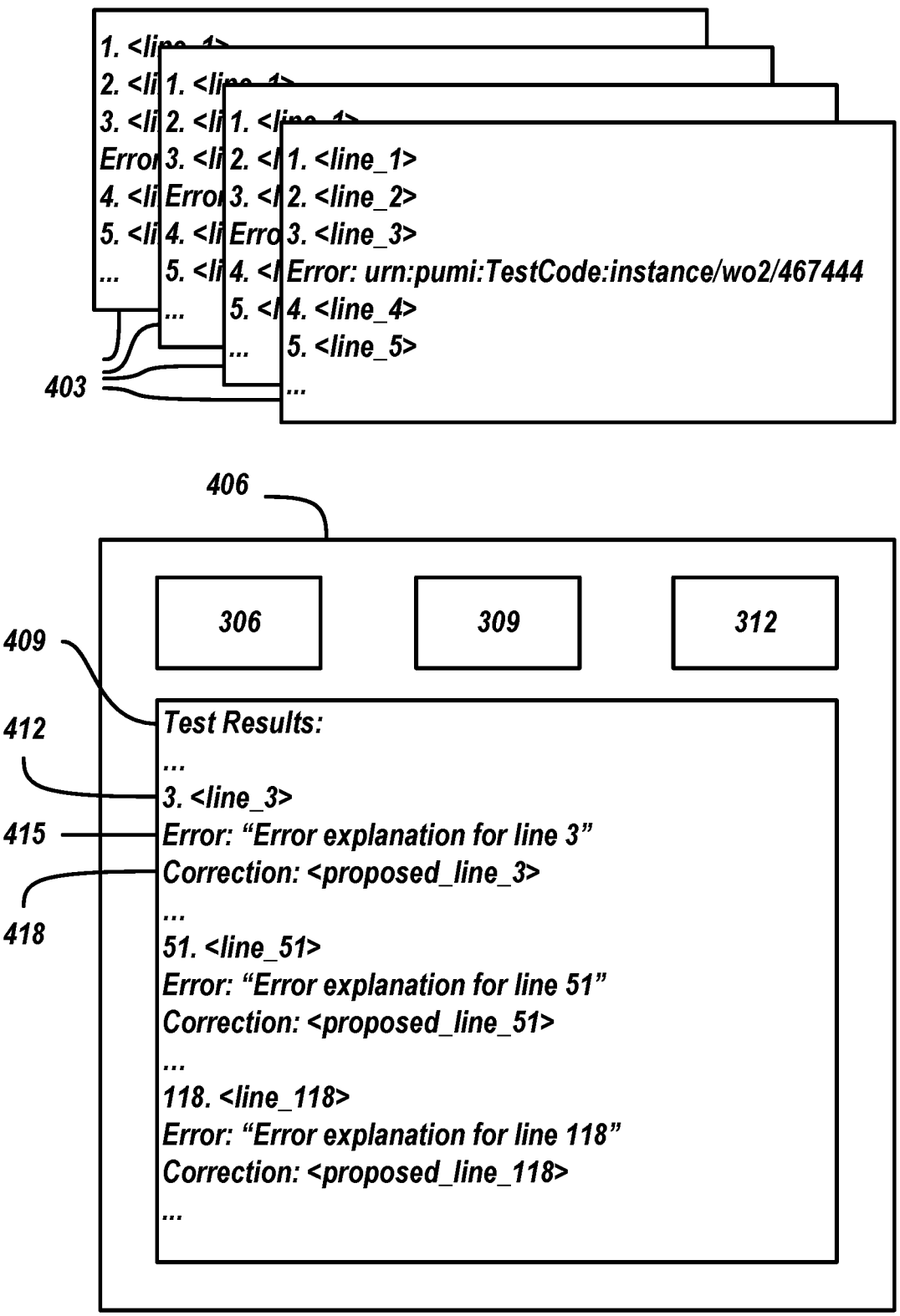
FIG. 4 illustrates an aggregation of testing logs from testing of a proposed code, in accordance with one or more embodiments.

FIG. 4 illustrates an aggregation 400 of testing logs from testing of a proposed code, in accordance with one or more embodiments. In some embodiments, aggregation 400 may include a plurality of testing logs 403 and a user interface 406. User interface 406 may include one or more portions with which a user may interact (e.g., portion 306, portion 309, and portion 312, as discussed in relation to FIG. 3). In some embodiments, user interface 406 may also include test results 409. Test results 409 may be an aggregation of testing logs 403 with one or more explanations and one or more proposed corrections. For example, test results 409 may include a line of code 412 that is associated with an error notification. In some embodiments, aggregation subsystem 120 may replace the error notification with an error explanation 415, which may describe the error notification in a more intuitive manner. In some embodiments, test results may also include a proposed correction 418 for fixing the line of code 412 associated with the error notification.

In some embodiments, aggregation subsystem 120 may compile error notifications from testing logs 403, removing redundancies from across testing logs 403. In some embodiments, aggregation subsystem 120 may condense test results 409 such that lines of code without error notifications are removed from the display. In some embodiments, aggregation subsystem 120 may highlight lines of code associated with error notifications such that they are more easily identified.

In some embodiments, proposed correction 418 may include text explaining a proposed correction, a proposed corrected version of line of code 412, or another proposed correction. In some embodiments, user interface 406 may include functionality for a user to accept or implement one or more proposed corrections. In some embodiments, such functionality may cause communication subsystem 112 to transmit, to a database (e.g., data node 104), a code change request including an error type of the one or more error types and a corresponding code change of the one or more corresponding code changes. This error may be forwarded as a code change request to the source code storage system, such as a Git-based version control repository. In some embodiments, proposed corrections may be queried by the user via a user interface to retrieve additional details, such as relevant documentation hyperlinks to remediate the error. User queries may also include data transformations, organizations, or code translations on the error explanations and proposed code corrections.

Returning to FIG. 1, error correction system 102 (e.g., machine learning subsystem 114) may receive a training dataset comprising a plurality of entries for a plurality of features. In some embodiments, the plurality of features may correspond to error types and the plurality of entries corresponds to corresponding code changes. In some embodiments, machine learning subsystem 114 may train, using the training dataset, a machine learning model to generate outputs that indicate predicted code changes associated with the one or more error types. For example, in some embodiments, determining the one or more proposed corrections for each error may include inputting, into the machine learning model, the one or more error types to obtain one or more predicted code changes associated with the one or more error types.

Figure 5:
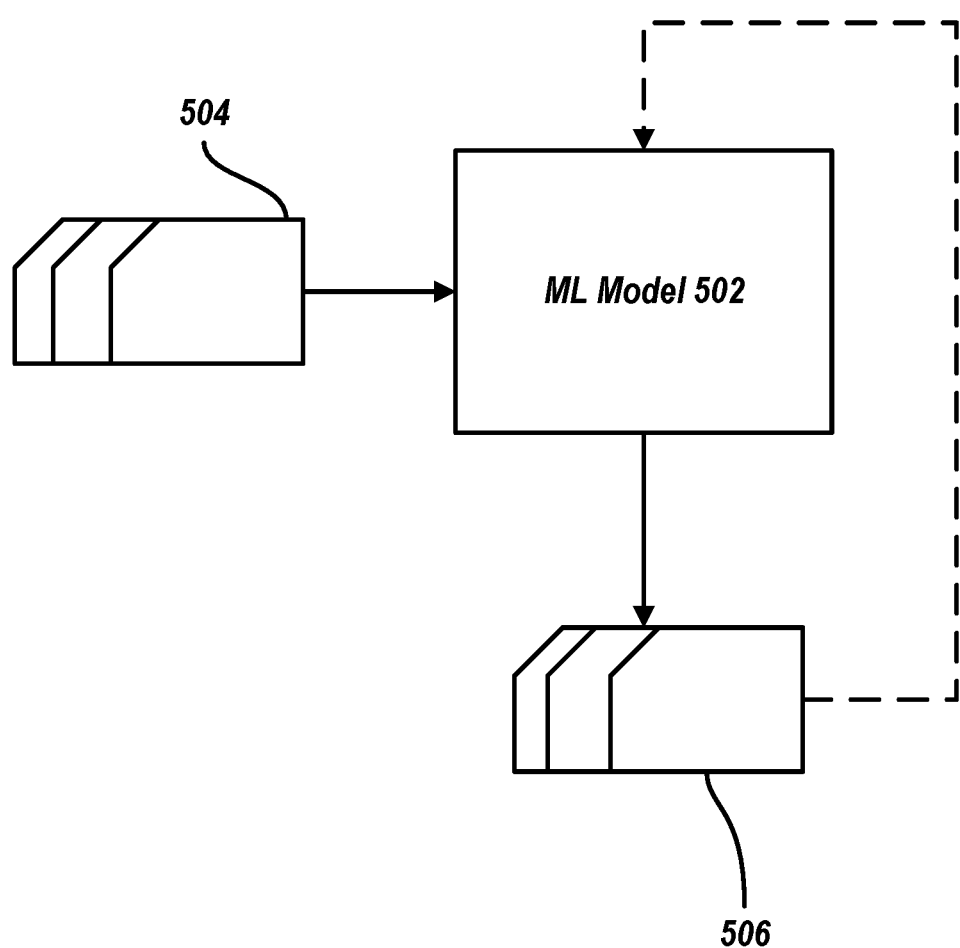
FIG. 5 illustrates an exemplary machine learning model, in accordance with one or more embodiments.

FIG. 5 illustrates an exemplary machine learning model 502, in accordance with one or more embodiments. The machine learning model may have been trained using features associated with entries, such as error types or characteristics associated with error notifications. The machine learning model may have been trained to predict code changes corresponding to the error types. The outputs may include corresponding match probabilities indicating a likelihood of a match between each detected error message and each error type. In some embodiments, machine learning subsystem 114 may use a deterministic model to show or hide the corresponding match probabilities from the user based on the match probability. In some embodiments, machine learning model 502 may be included in machine learning subsystem 114 or may be associated with machine learning subsystem 114. Machine learning model 502 may take input 504 and may generate outputs 506 (e.g., predicted code changes). The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, semi-supervised GPT-based models may be utilized to identify errors and generate further responses to user queries regarding error explanations and proposed corrections. Such models may allow users to ask follow-up questions through an automated chat interface. GPT-based models may be able to generate easily-intelligible responses to user queries. In some embodiments, a user may fine-tune the model by adding custom error matching patterns and corresponding explanations, for example, if the model-generated explanations lack clarity. In some embodiments, machine learning subsystem 114 may use GPT-based models to parse test outputs and identify specific errors within the test outputs. For example, machine learning subsystem 114 may input unlabeled application logs into a GPT-based model to cause the model to identify errors. In some embodiments, machine learning subsystem 114 may further input instructions to identify errors into the GPT-based model. Such GPT-based models may also be used to create explanations (e.g., that are more easily understood than default low-level error messages) along with the proposed corrections to the errors. In some embodiments, GPT-based models may be trained on an organization's databases to provide explanations aligned with an organization's internal language, terms, and aliases to generate relevant human-like responses with a high-degree of accuracy.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Computing Environment

Figure 6:
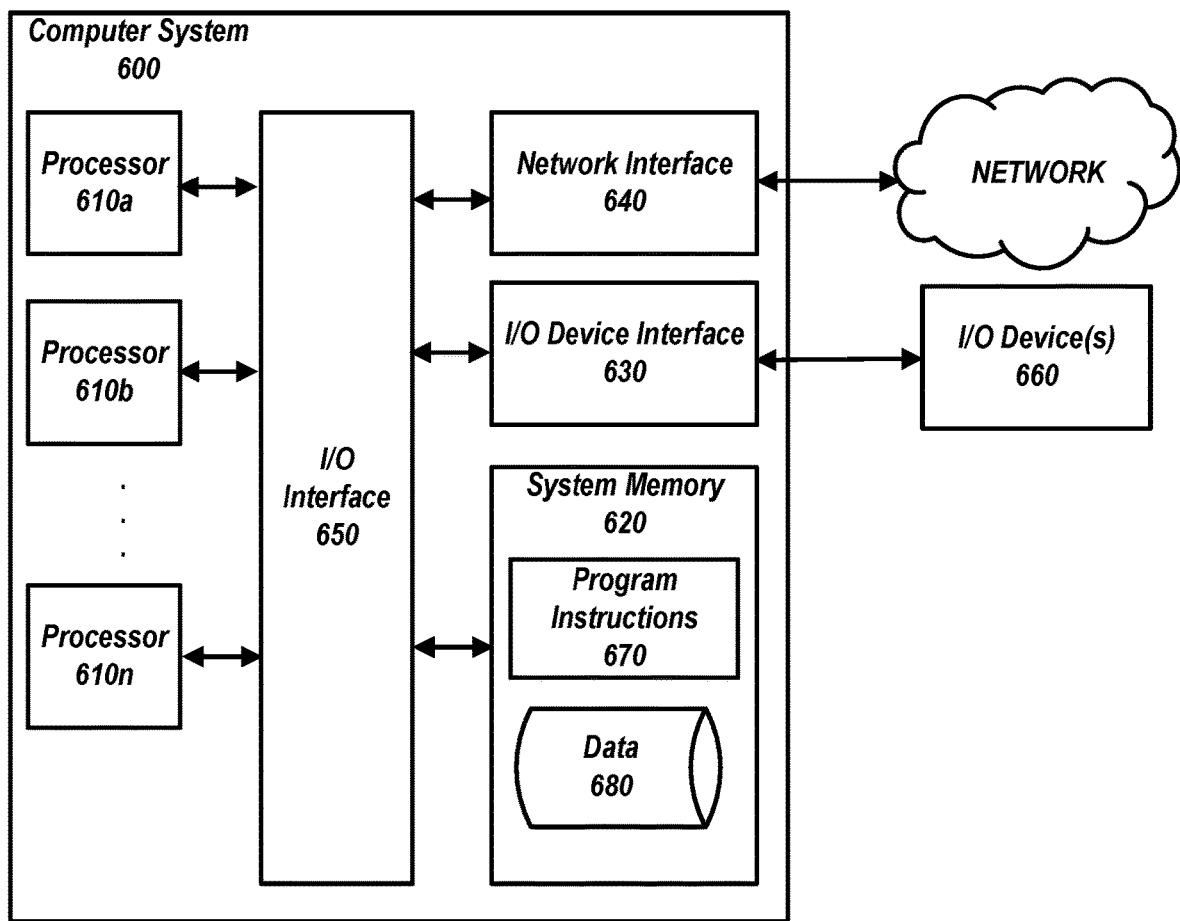
FIG. 6 illustrates a computing device, in accordance with one or more embodiments.

FIG. 6 shows an example computing system 600 that may be used in accordance with some embodiments of this disclosure. In some instances, computing system 600 is referred to as a computing system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube or liquid crystal display monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
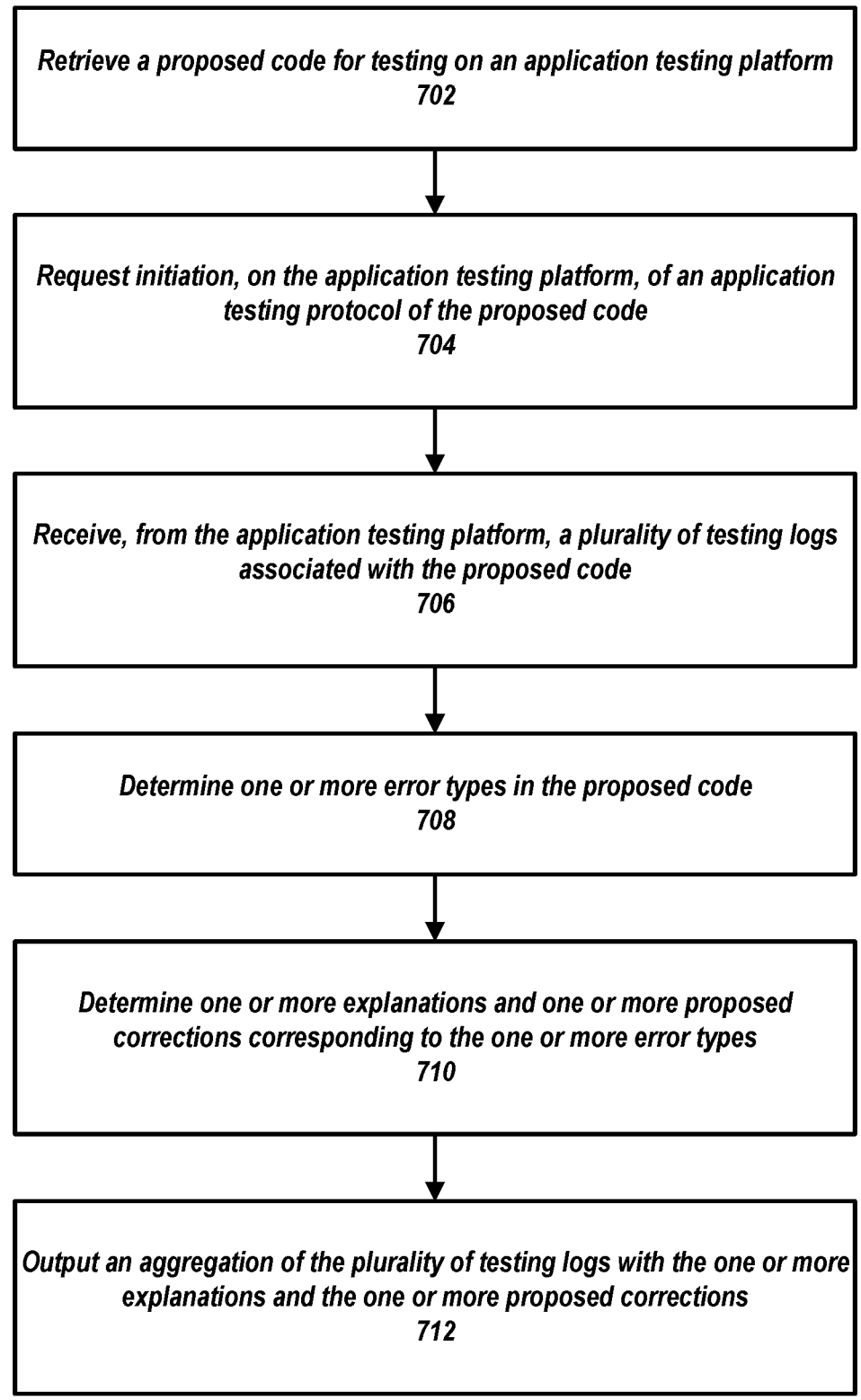
FIG. 7 shows a flowchart of the process for facilitating error corrections during testing of proposed code, in accordance with one or more embodiments.

FIG. 7 shows a flowchart of the process 700 for facilitating error corrections during testing of proposed code, in accordance with one or more embodiments. For example, the system may use process 700 (e.g., as implemented on one or more system components described above) in order to facilitate determination of proposed error corrections based on error notifications.

At 702, process 700 (e.g., using one or more of processors 610a-610n) retrieves a proposed code for testing on an application testing platform. For example, process 700 may retrieve the proposed code via a network from I/O devices 660 or elsewhere. In some embodiments, the proposed code may be retrieved from one or more remote computing devices (e.g., I/O devices 660). In some embodiments, the error correction system additionally receives (e.g., via I/O device interface 630) a plurality of inputs from a user. The inputs may include a user registration, an application registration, a configuration selection, and other user inputs. The user registration may include authentication information associated with a user, the application registration may include one or more testing requests, and the configuration selection may include a language configuration. In some embodiments, the error correction system may provide (e.g., via I/O device interface 630) functionality for the user to select the plurality of inputs corresponding to the user registration, the application registration, and the configuration selection. The system may then generate a text file by aggregating the inputs from the user with an application testing code such that the text file is readable by an application testing platform. By doing so, the error correction system aggregates all information relevant to the user's testing needs along with the application testing code for seamless initiation of an application testing protocol.

At 704, process 700 (e.g., using one or more of processors 610a-610n) requests initiation, on the application testing platform, of an application testing protocol of the proposed code. For example, process 700 may request initiation of the application testing protocol via the network. In some embodiments, the application testing protocol may be performed by one or more processors of another computer system accessible via the network. Error correction system may request initiation of the application testing protocol of the proposed code according to the inputs received via I/O device interface 630. Error correction system 102 may request initiation of the application testing protocol according to the text file including the aggregated inputs from the user. In some embodiments, requesting initiation, on the application testing platform, of the application testing protocol may involve requesting initiation of at least a unit testing protocol, a functional testing protocol, a performance testing protocol, and any other required or desired testing protocols. By doing so, error correction system requests initiation of all testing protocols required or desired by the user according to the specifications input by the user.

In some embodiments, the error correction system may determine an environment in which the proposed code will run after completion of the application testing protocol. For example, the error correction system 102 may request information about the environment from the user (e.g., via I/O device interface 630). Upon requesting initiation of the application testing protocol, the error correction system may transmit details associated with the environment to the application testing platform (e.g., via the network) to enable the application testing platform to mimic the environment during the application testing protocol. By doing so, the error correction system increases the likelihood that the final code will succeed in the environment.

At 706, process 700 (e.g., using one or more of processors 610a-610n) receives, from the application testing platform, a plurality of testing logs associated with the proposed code. Process 700 may receive the testing logs via the network (e.g., from another computer system running the application testing protocol). In some embodiments, the error correction system may aggregate the plurality of testing logs by compiling the testing logs and reducing redundancies within the compilation. By doing so, the error correction system produces test results that are far easier to review for errors.

At step 708, process 700 (e.g., using one or more of processors 610a-610n) determines one or more error types in the proposed code. Process 700 may determine the error types, for example, by comparing error notifications in the testing logs with error types stored in system memory 620 (e.g., data 680). In some embodiments, the error correction system may determine the error types by retrieving, from a database, a listing of common error types and comparing characteristics of the error notifications with the listing of common error types. By determining categories of error types to which the error notifications belong, the error correction system bypasses the need for massive data repositories in order to provide users with accurate explanations of and corrections to every possible coding error.

At 710, process 700 (e.g., using one or more of processors 610a-610n) determines one or more explanations and one or more proposed corrections corresponding to the one or more error types. Process 700 may determine the explanations and corrections by accessing explanations and proposed corrections stored in a database or within system memory 620. By doing so, the error correction system generates test results that are more easily interpretable by the user.

In some embodiments, the error correction system may determine the explanations by retrieving, from a database, a listing of common error types and corresponding intuitive descriptions, identifying the error types (e.g., associated with the error notifications) within the listing, and determining the explanations based on corresponding intuitive descriptions associated with the error types. By doing so, the error correction system decodes cryptic language of the error notifications to generate more intuitive explanations.

In some embodiments, the error correction system may determine the proposed corrections by retrieving, from a database, a listing of common error types and corresponding code changes, identifying the error types (e.g., associated with the error notifications) within the listing, and determining the proposed corrections based on corresponding code changes associated with the error types. By doing so, the error correction system reduces the labor-intensive and time-consuming process of fixing errors in the proposed code, even after the technical language is decoded.

At 712, process 700 (e.g., using one or more of processors 610a-610n) outputs an aggregation of the plurality of testing logs with the one or more explanations and the one or more proposed corrections. In some embodiments, aggregating the testing logs with the explanations and proposed corrections may involve eliminating redundancies across the testing logs and translating the error notifications into the explanations and the proposed corrections. By generating these outputs, the error correction system provides the user with information that is more easily interpretable or utilized by the user.

In some embodiments, the error correction system may receive a training dataset including entries and features. For example, the features may correspond to error types and the entries may correspond to corresponding code changes. Error correction system may train, using the training dataset, a machine learning model to generate outputs that indicate predicted code changes associated with the error types. Determining the proposed corrections for each error may thus involve inputting, into the machine learning model, the error types to obtain predicted code changes associated with the error types. In some embodiments, the error correction system may transmit, to a database, a code change request including an error type and a corresponding code change such that the code change may be implemented automatically. By doing so, the error correction system may intelligently determine corrections for errors within the code and may implement those corrections within requiring user input.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising receiving, via a user interface, a proposed code for testing on an application testing platform, requesting initiation, on the application testing platform, of an application testing protocol of the proposed code according to inputs received via the user interface, receiving, from the application testing platform, a plurality of testing logs associated with the proposed code, the plurality of testing logs comprising one or more error notifications; determining, based on the one or more error notifications, one or more error types in the proposed code, determining one or more explanations and one or more proposed corrections corresponding to the one or more error types, and outputting, via the user interface, an aggregation of the plurality of testing logs with the one or more explanations and the one or more proposed corrections.

2. The method of any one of the preceding embodiments, wherein determining the one or more explanations comprises retrieving, from a database, a listing of common error types and corresponding intuitive descriptions, identifying the one or more error types within the listing, and determining the one or more explanations based on one or more corresponding intuitive descriptions associated with the one or more error types.

3. The method of any one of the preceding embodiments, wherein determining the one or more proposed corrections comprises retrieving, from a database, a listing of common error types and corresponding code changes, identifying the one or more error types within the listing, and determining the one or more proposed corrections based on one or more corresponding code changes associated with the one or more error types.

4. The method of any one of the preceding embodiments, further comprising transmitting, to the database, a code change request comprising an error type of the one or more error types and a corresponding code change of the one or more corresponding code changes.

5. The method of any one of the preceding embodiments, further comprising receiving a training dataset comprising a plurality of entries for a plurality of features, wherein the plurality of features corresponds to error types and the plurality of entries corresponds to corresponding code changes, and training, using the training dataset, a machine learning model to generate outputs that indicate predicted code changes associated with the one or more error types.

6. The method of any one of the preceding embodiments, wherein determining the one or more proposed corrections for each error comprises inputting, into the machine learning model, the one or more error types to obtain one or more predicted code changes associated with the one or more error types.

7. The method of any one of the preceding embodiments, wherein aggregating the plurality of testing logs with the one or more explanations and the one or more proposed corrections comprises eliminating redundancies across the plurality of testing logs, and translating the one or more error notifications into the one or more explanations and the one or more proposed corrections.

8. The method of any one of the preceding embodiments, further comprising determining an environment in which the proposed code will run after completion of the application testing protocol, and upon requesting initiation of the application testing protocol, transmitting details associated with the environment to the application testing platform to enable the application testing platform to mimic the environment during the application testing protocol.

9. The method of any one of the preceding embodiments, wherein requesting initiation, on the application testing platform, of the application testing protocol comprises requesting initiation of at least a unit testing protocol, a functional testing protocol, and a performance testing protocol.

10. The method of any one of the preceding embodiments, further comprising receiving, via the user interface, a plurality of inputs from a user, the inputs comprising a user registration, an application registration, and a configuration selection, wherein the user registration comprises authentication information associated with a user, the application registration comprises one or more testing requests, and the configuration selection comprises a language configuration, and generating a text file by aggregating the plurality of inputs from the user with an application testing code such that the text file is readable by the application testing platform.

11. The method of any one of the preceding embodiments, wherein requesting initiation of the application testing protocol of the proposed code according to the inputs received via the user interface comprises requesting initiation of the application testing protocol according to the text file.

12. The method of any one of the preceding embodiments, further comprising providing, via the user interface, functionality for the user to select the plurality of inputs corresponding to the user registration, the application registration, and the configuration selection.

13. The method of any one of the preceding embodiments, further comprising receiving a request, via the user interface, to abort the application testing protocol, and requesting a discontinuation, on the application testing platform, of the application testing protocol of the proposed code.

14. The method of any one of the preceding embodiments, further comprising modifying one or more portions of the aggregation of the plurality of testing logs to emphasize the one or more error notifications.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

18. A system comprising cloud-based circuitry for performing any of embodiments 1-14.

What is claimed is:

1. A system for facilitating error corrections during testing of proposed code, the system comprising:
  at least one processor, at least one memory, and computer-readable media having computer-executable instructions stored thereon, the computer-executable instructions, when executed by the at least one processor, causing the system to perform operations comprising:
    receiving, via a user interface, a plurality of inputs from a user comprising a user registration, an application registration, and a configuration selection, wherein the user registration comprises authentication information associated with a user, the application registration comprises one or more testing requests, and the configuration selection comprises a language configuration;
    generating a text file by aggregating the plurality of inputs from the user with an application testing code such that the text file is readable by an application testing platform;
    receiving, via the user interface, a proposed code for testing on the application testing platform;
    requesting initiation, on the application testing platform, of an application testing protocol of the proposed code according to the text file;
    receiving, from the application testing platform, a plurality of testing logs associated with the proposed code, the plurality of testing logs comprising one or more error notifications;
    determining, based on the one or more error notifications, one or more error types in the proposed code;
    generating, using one or more Generative-Pretrained Transformer (GPT) models, (a) one or more explanations corresponding to the one or more error types and (b) one or more proposed error corrections for each of the one or more error types;
    outputting, via the user interface, condensed test results generated based on (i) an aggregation of the plurality of testing logs with the one or more explanations and the one or more proposed error corrections and (ii) a removal of at least a portion of one or more of the plurality of testing logs comprising code that is unassociated with the one or more error notifications; and
    providing, via the user interface outputting the condensed test results, a code change request to a data node to implement at least one of the one or more proposed error corrections.

2. A method for facilitating error corrections during testing of proposed code by generating intuitive messages for addressing error notifications, the method comprising:
  receiving, via a user interface, a proposed code for testing on an application testing platform and a text file comprising an aggregation of inputs received via the user interface including authentication information, one or more testing requests, and a language configuration;
  requesting initiation, on the application testing platform, of an application testing protocol of the proposed code according to the text file;
  receiving, from the application testing platform, a plurality of testing logs associated with the proposed code, the plurality of testing logs comprising one or more error notifications;
  determining, based on the one or more error notifications, one or more error types in the proposed code;
  determining, using one or more generative transformer models, (i) one or more explanations and (ii) one or more proposed corrections corresponding to the one or more error types;
  outputting, via the user interface, condensed test results based on an aggregation of the plurality of testing logs with the one or more explanations and the one or more proposed corrections and a removal of at least a portion of one or more of the plurality of testing logs unassociated with the one or more error notifications; and
  providing, via the user interface, a code change request to implement at least one of the one or more proposed corrections.

3. The method of claim 2, wherein determining the one or more explanations comprises:
  retrieving, from a database, a listing of common error types and corresponding intuitive descriptions;

identifying the one or more error types within the listing of common error types; and determining the one or more explanations based on one or more of the corresponding intuitive descriptions associated with the one or more error types.

4. The method of claim 2, wherein determining the one or more proposed corrections comprises:

retrieving, from a database, a listing of common error types and corresponding code changes;

identifying the one or more error types within the listing of common error types; and determining the one or more proposed corrections based on one or more of the corresponding code changes associated with the one or more error types.

5. The method of claim 4, wherein providing the code change request comprises:

transmitting, to the database, the code change request comprising an error type of the one or more error types and a corresponding code change of the one or more of the corresponding code changes.

6. The method of claim 2, further comprising:

receiving a training dataset comprising a plurality of entries for a plurality of features, wherein the plurality of features corresponds to error types and the plurality of entries corresponds to corresponding code changes; and training, using the training dataset, a machine learning model to generate outputs that indicate predicted code changes associated with the one or more error types, wherein the one or more generative transformer models comprise the machine learning model.

7. The method of claim 6, wherein determining the one or more proposed corrections for each error comprises inputting, into the machine learning model, the one or more error types to obtain one or more predicted code changes associated with the one or more error types.

8. The method of claim 2, further comprising:

generating test results comprising the aggregation of the plurality of testing logs with the one or more explanations and the one or more proposed corrections; and generating the condensed test results by:

aggregating the plurality of testing logs with the one or more explanations and the one or more proposed corrections;

eliminating redundancies across the plurality of testing logs; and translating the one or more error notifications into the one or more explanations and the one or more proposed corrections to obtain the condensed test results.

9. The method of claim 2, further comprising:

determining an environment in which the proposed code will run after completion of the application testing protocol; and in response to requesting initiation of the application testing protocol, transmitting details associated with the environment to the application testing platform to enable the application testing platform to mimic the environment during the application testing protocol.

10. The method of claim 2, wherein requesting initiation, on the application testing platform, of the application testing protocol comprises requesting initiation of at least a unit testing protocol, a functional testing protocol, and a performance testing protocol.

11. The method of claim 2, further comprising:

receiving, via the user interface, the inputs comprising a user registration, an application registration, and a configuration selection, wherein the user registration comprises the authentication information associated with a user, the application registration comprises the one or more testing requests, and the configuration selection comprises the language configuration; and generating the text file comprising the aggregation of the inputs by aggregating the inputs with an application testing code such that the text file is readable by the application testing platform.

12. The method of claim 11, further comprising:

providing, via the user interface, functionality for the user to select the inputs corresponding to the user registration, the application registration, and the configuration selection.

13. The method of claim 2, further comprising:

receiving a request, via the user interface, to abort the application testing protocol; and requesting a discontinuation, on the application testing platform, of the application testing protocol of the proposed code.

14. The method of claim 2, wherein the portion of the one or more of the plurality of testing logs unassociated with the one or more error notifications comprise a first portion, the method further comprises:

modifying one or more second portions of the aggregation of the plurality of testing logs to emphasize the one or more error notifications.

15. One or more non-transitory, computer-readable media storing instructions that, when executed by one or more processors, cause operations comprising:

receiving, via a user interface, a proposed code for testing on an application testing platform;

requesting initiation, on the application testing platform, of an application testing protocol of the proposed code according to a text file comprising a first aggregation of inputs received via the user interface including a user registration, an application registration, and a configuration selection;

receiving, from the application testing platform, a plurality of testing logs associated with the proposed code comprising one or more error notifications;

determining, based on the one or more error notifications, one or more error types in the proposed code;

determining, using a machine learning model, one or more explanations corresponding to the one or more error types; and outputting, via the user interface, condensed test results generated based on an aggregation of the plurality of testing logs with the one or more explanations, wherein one or more portions of the plurality of testing logs unassociated with the one or more error notifications are removed.

16. The one or more non-transitory, computer-readable media of claim 15, wherein determining the one or more explanations comprises:

retrieving, from a database, a listing of common error types and corresponding intuitive descriptions;

identifying the one or more error types within the listing of common error types; and determining the one or more explanations based on one or more of the corresponding intuitive descriptions associated with the one or more error types.

17. The one or more non-transitory, computer-readable media of claim 15, wherein the operations further comprise:

determining, using the machine learning model, one or more proposed corrections for the one or more error types; and modifying the aggregation of the plurality of testing logs to include the one or more proposed corrections for the one or more error types.

18. The one or more non-transitory, computer-readable media of claim 17, wherein determining the one or more proposed corrections comprises:
retrieving, from a database, a listing of common error types and corresponding code changes;
identifying the one or more error types within the listing of common error types; and
determining the one or more proposed corrections based on one or more of the corresponding code changes associated with the one or more error types.

19. The one or more non-transitory, computer-readable media of claim 18, wherein the operations further comprise:
transmitting, to the database, a code change request comprising an error type of the one or more error types and a corresponding code change of the one or more of the corresponding code changes.

* * * * *